US008580425B2

(12) United States Patent
Kim (10) Patent No.: US 8,580,425 B2
(45) Date of Patent: Nov. 12, 2013

(54) SECONDARY BATTERY

(75) Inventor: Changseob Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 655 days.

(21) Appl. No.: 12/458,327

(22) Filed: Jul. 8, 2009

(65) Prior Publication Data

US 2010/0040943 A1 Feb. 18, 2010

(30) Foreign Application Priority Data

Aug. 14, 2008 (KR) ........................ 10-2008-0079973

(51) Int. Cl.
*H01M 2/02* (2006.01)
*H01M 2/04* (2006.01)
*H01M 2/06* (2006.01)

(52) U.S. Cl.
USPC ............................ 429/163; 429/178; 429/186

(58) Field of Classification Search
USPC ....................... 429/163, 180, 185, 7, 178, 186
See application file for complete search history.

(56) References Cited

U.S. PATENT DOCUMENTS

| 2,641,625 | A | * | 6/1953 | Elmer ............................ 429/119 |
| 5,563,018 | A | | 10/1996 | Buhr et al. |
| 6,146,789 | A | * | 11/2000 | Horie et al. ..................... 429/185 |
| 6,573,000 | B1 | * | 6/2003 | Miyazaki et al. .............. 429/185 |
| 7,736,800 | B2 | | 6/2010 | Lee |
| 2002/0058184 | A1 | | 5/2002 | Hayashi |
| 2005/0266279 | A1 | * | 12/2005 | Kim .................................. 429/7 |
| 2006/0093907 | A1 | * | 5/2006 | Jeon et al. ..................... 429/180 |
| 2006/0099500 | A1 | | 5/2006 | Jeon |
| 2006/0105238 | A1 | * | 5/2006 | Woo .............................. 429/180 |
| 2008/0107962 | A1 | | 5/2008 | Uh |

FOREIGN PATENT DOCUMENTS

| JP | 06-041050 A | | 2/1994 |
| JP | 2001-084991 A | | 3/2001 |
| KR | 2002/0036886 A1 | * | 5/2002 |
| KR | 10-2003-0034429 A | | 5/2003 |
| KR | 10-0614376 B1 | | 8/2006 |
| KR | 10 2007-0112486 A | | 11/2007 |

OTHER PUBLICATIONS

Machine Translation of: KR-2002/0036886 A, Nam, Jeong-Il, May 2002.*
Office Action issued in corresponding Chinese application, 200910165214.3, dated Sep. 15, 2011.
Japanese Office Action in JP 2009-151749, dated Jul. 3, 2012 (KIM).

* cited by examiner

*Primary Examiner* — Kenneth Douyette
(74) *Attorney, Agent, or Firm* — Lee & Morse, P.C.

(57) ABSTRACT

A secondary battery, including an electrode assembly; a can housing the electrode assembly; and a cap assembly on the can, wherein the cap assembly includes: a cap plate having a terminal hole and a terminal groove, a gasket on the cap plate having a center hole, and an electrode terminal having a terminal post in the center hole and a plate portion disposed on the gasket; the gasket including a gasket post in the terminal hole and a gasket plate seated in the terminal groove; at least one side of the terminal plate and at least one side of the gasket plate being spaced apart from at least one side of the terminal groove.

7 Claims, 6 Drawing Sheets

SECONDARY BATTERY

BACKGROUND

1. Field

Embodiments relate to a secondary battery.

2. Description of the Related Art

A lithium ion secondary battery includes an electrode assembly comprised of cathode and anode plates, electrolyte and a separator as main components, which battery may be repeatedly charged or discharged.

The electrode assembly may be combined with a can and a cap assembly, thereby forming a cell. The electrode assembly may be contained in a can of a predetermined shape in which an opening is formed. The opening of the can may be covered with the cap assembly.

When the can is covered with the cap plate of the cap assembly, edges of the cap plate may be combined with edges of the can by welding.

SUMMARY

Embodiments are therefore directed to a secondary battery which substantially overcomes one or more limitations and disadvantages of the related art.

It is a feature of an embodiment to provide a secondary battery that may prevent a portion of a gasket of a cap plate from being burned during a process of combining a cap assembly with a can.

It is therefore another feature of an embodiment to provide a secondary battery that may reduce internal heat generation and prevent, e.g., explosion, etc. by short-circuiting a can and an electrode terminal quickly when the secondary battery is compressed.

At least one of the above and other features and advantages may be realized by providing a secondary battery, including an electrode assembly, a can housing the electrode assembly, and a cap assembly on the can, wherein the cap assembly includes a cap plate having a terminal hole and a terminal groove having at least one side, a gasket on the cap plate having a center hole, and an electrode terminal having a terminal post in the center hole and a plate portion disposed on the gasket and having at least one side, the gasket including a gasket post in the terminal hole, and a gasket plate seated in the terminal groove, the gasket plate having a flat upper part and at least one side, and at least one side of the plate portion of the electrode terminal and at least one side of the gasket plate being spaced apart from at least one side of the terminal groove.

The plate portion, the gasket plate and the terminal groove may each have a first side, and the first side of the plate portion and the first side of the gasket plate may be spaced apart from the first side of the terminal groove.

A distance between the first side of the plate portion and the first side of the terminal groove may be about the same as a distance between the first side of the gasket plate and the first side of the terminal groove.

The plate portion, the gasket plate and the terminal groove may each have a second side different from the first side, and the second side of the plate portion and the second side of the gasket plate may be spaced apart from the second side of the terminal groove.

A distance between the second side of the plate portion and the second side of the terminal groove may be about the same as a distance between the second side of the gasket plate and the second side of the terminal groove.

The plate portion and the gasket plate may each have a rounded shape and an outer circumference defining the at least one side; wherein the terminal groove has a rounded shape and an inner circumference defining the at least one side; and wherein the outer circumference of the plate portion and the outer circumference of the gasket plate are spaced apart from the inner circumference of the terminal groove.

A distance between the outer circumference of the plate portion and the inner circumference of the terminal groove may be about the same as a distance between the outer circumference of the gasket plate and the inner circumference of the terminal groove.

The gasket plate may include an extended part extending toward one of the sides of the terminal groove from the side of the gasket plate.

The gasket plate may include an extended part extending toward the inner circumference of the terminal groove from the outer circumference of the gasket plate.

The extended part may contact one of the sides of the terminal groove.

The extended part may be spaced apart from one of the sides of the terminal groove.

The extended part may contact the inner circumference of the terminal groove.

The extended part may be spaced apart from the inner circumference of the terminal groove.

The gasket plate and the extended part may each have a thickness, and the thickness of the gasket plate may be about the same as the thickness of the extended part.

The gasket plate and the extended part may each have a thickness, and the thickness of the gasket plate may be about the same as the thickness of the extended part.

The gasket plate may include a projected part on the extended part extending away from the can.

The gasket plate may include a projected part on the extended part extending away from the can.

The extended part and the projected part may have a total thickness and the terminal groove may have a depth; and wherein the total thickness of the extended part and projected part may be about the same as, or smaller than the depth of the terminal groove.

The extended part and the projected part may have a total thickness and the terminal groove may have a depth; and wherein the total thickness of the extended part and projected part may be about the same as, or smaller than the depth of the terminal groove.

The secondary battery may further include an insulation plate under the cap plate.

The gasket and the insulation plate may include the same insulating material.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2008-0079973, filed on Aug. 14, 2008, in the Korean Intellectual Property Office (KIPO), and entitled, "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a metal" may represent a single compound, e.g., aluminum, or multiple compounds in combination, e.g., aluminum mixed with metal.

Hereinafter, embodiments will be described in detail with reference to the accompanying drawings. The aspects and features of the embodiments and methods for achieving the aspects and features will be apparent by referring to the embodiments to be described in detail with reference to the accompanying drawings. However, the embodiments are not limited to the embodiments disclosed hereinafter, but may be implemented in diverse forms. The matters defined in the description, such as the detailed construction and elements, are nothing but specific details provided to assist those of ordinary skill in the art in a comprehensive understanding of the embodiments, and the embodiments are only defined within the scope of the appended claims. In the entire description of the present invention, the same drawing reference numerals are used for the same elements across various figures.

Figure 1:
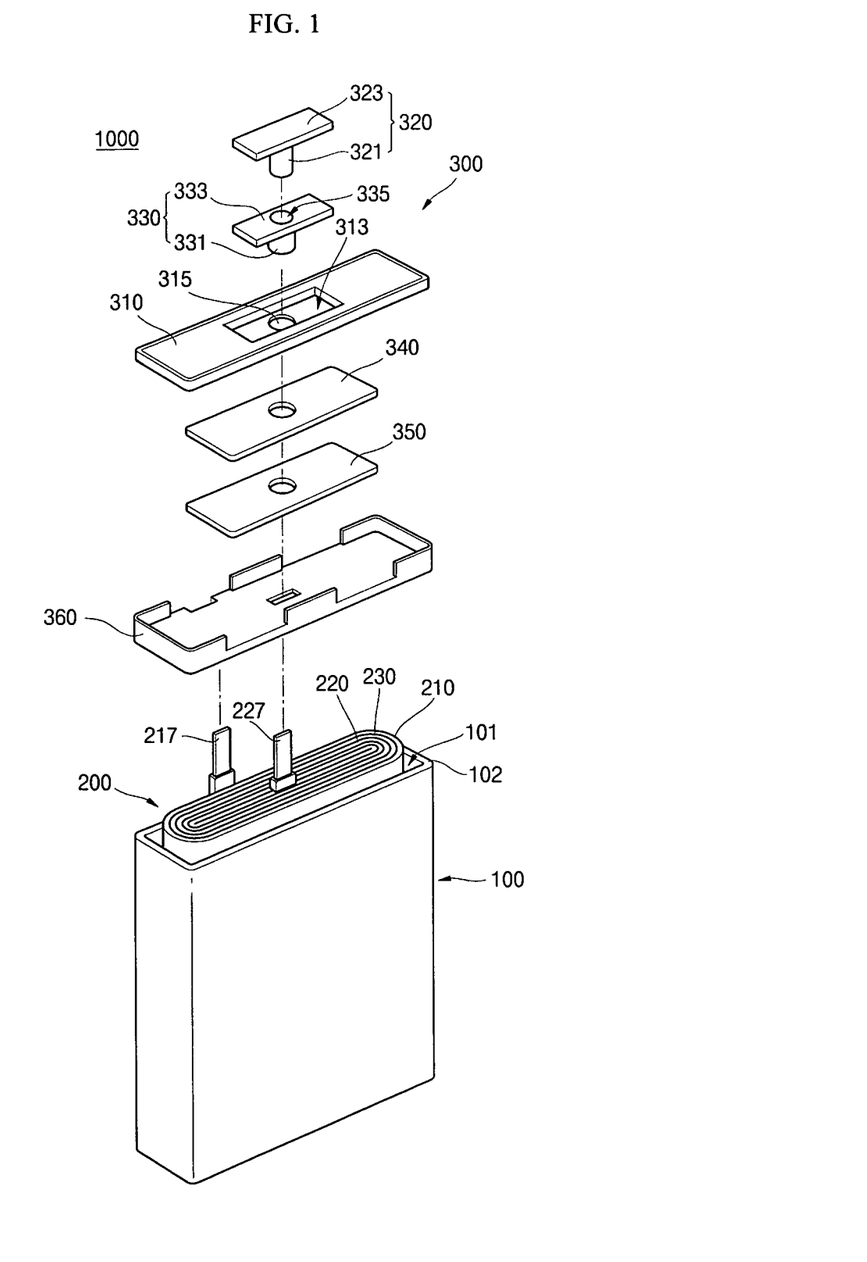
FIG. 1 illustrates a perspective view of a secondary battery according to a first embodiment.
Figure 2:
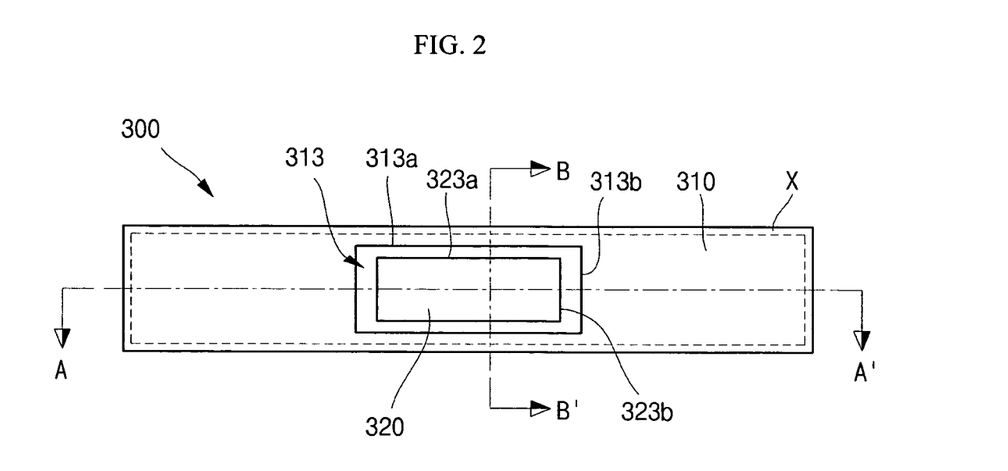
FIG. 2 illustrates a plan view of a cap assembly according to the first embodiment.
Figure 3:
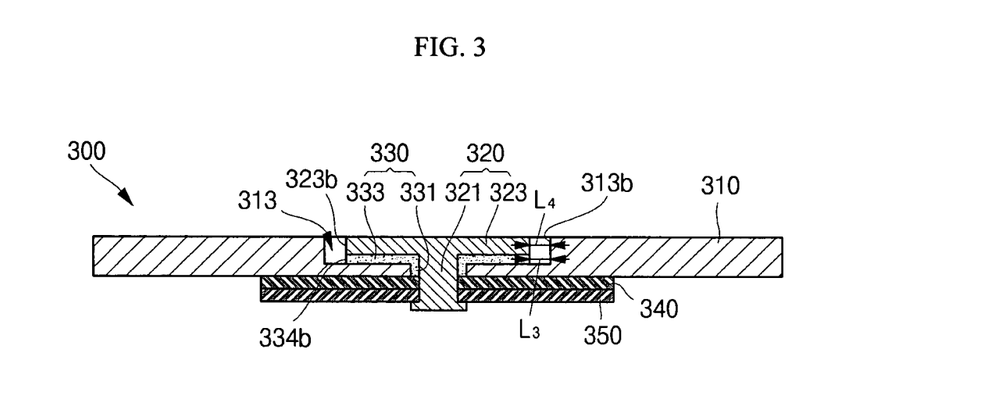
FIG. 3 illustrates a vertical sectional view of the cap assembly along the line A-A' of FIG. 2.
Figure 4:
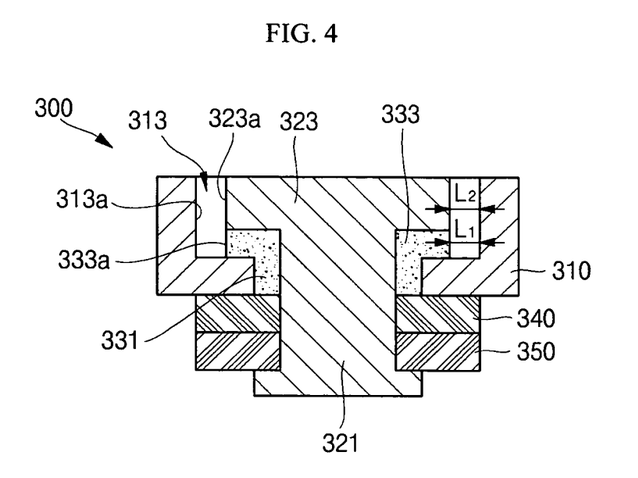
FIG. 4 illustrates a vertical sectional view of the cap assembly along the line B-B' of FIG. 2.

FIG. 1 illustrates a perspective view of a secondary battery 1000 according to the first embodiment. FIG. 2 illustrates a plan view of a cap assembly 300 according to the first embodiment. FIGS. 3 and 4 illustrate vertical sectional views of the cap assembly along the lines A-A' and B-B', respectively.

Referring to FIG. 1, the secondary battery 1000 may include a can 100, an electrode assembly 200 in the can 100 and a cap assembly 300 covering an opening 101 of the can 100.

The can 100 may have a roughly rectangular shape and may include the opening 101. The can 100 may be made of, e.g., metal, and may function as a terminal in itself. The electrode assembly 200 may be inserted into the can 100 through the opening 101.

The electrode assembly 200 may include first and second electrode plates 210 and 220 and a separator 230. The electrode assembly 200 may be formed by interposing the separator 230 between the first and second electrode plates 210 and 220 and winding them in a jelly-roll shape.

The first electrode plate 210 may include a first electrode collector (not shown) and a first electrode coating portion (not shown). The first electrode collector may be formed of, e.g., aluminum (Al) foil having excellent conductivity, when the first electrode plate 210 is a cathode.

The first electrode coating portion may be provided on the first electrode collector, and may include, e.g., a first electrode active material, conductive material and binder. The first electrode active material may include, e.g., lithium cobalt oxide ($LiCoO_2$), lithium manganese oxide ($LiMn_2O_4$) or lithium nickel oxide ($LiNiO_2$). The conductive material may include, e.g., carbon black. The binder may include, e.g., polyvinylidene fluoride (PVDF), styrene-butadiene rubber (SBR) or polytetrafluoroethylene (PTFE), dissolved and dispersed in a volatile solvent, e.g., n-methylpyrrolidone (NMP), an organic solvent or water.

Ends of the first electrode collector may include a first electrode non-coating portion (not shown), other than the first electrode coating portion. A first electrode tab 217 may be attached to the first electrode non-coating portion and projected toward the opening 101 of the can 100. The first electrode tab 217 may be made of, e.g., aluminum. A first insulation tape (not shown) may be provided on a portion of the first electrode tab 217 protruding from the electrode assembly 200 in order to prevent a short.

The second electrode plate 220 may include a second electrode collector (not shown) and a second electrode coating portion (not shown). The second electrode collector may include, e.g., copper (Cu) foil having excellent conductivity, when the second electrode plate 220 is an anode.

The second electrode coating portion may be provided on the second electrode collector and may include, e.g., a second electrode active material, conductive material and binder. The second electrode active material may include, e.g., carbonic (C) material, Si, Sn, tin oxide, composite tin alloy, transition metal oxide, lithium metal nitride or lithium metal oxide. Typically, carbonic material is used as the second electrode active material. The conductive material may include, e.g., carbon black. The binder may include, e.g., PVDF, SBR or PTFE, dissolved and dispersed in a volatile solvent, e.g., NMP, an organic solvent or water. The conductive material may not be used in the second electrode plate 220 because conductivity of the second electrode active material itself may be high.

Ends of the second electrode collector may include a second electrode non-coating portion (not shown), other than the second electrode coating portion. A second electrode tab 227 may be attached to the second electrode non-coating portion and projected toward the upper opening 101 of the can 100. The second electrode tab 227 may include, e.g., copper (Cu) or nickel (Ni). A second insulation tape (not shown) may be provided on a portion of the second electrode tab 227 protruding out of the electrode assembly 200 to prevent a short.

In the above description, it has been explained that the first electrode plate 210 is the cathode and the second electrode plate 220 is the anode. However, the first electrode plate 210 may be an anode and the second electrode plate 220 may be a cathode. Materials of the collectors and coating portions may be exchanged with each other.

The can 100 functioning as a terminal in the rectangular secondary battery 1000 may be a cathode. When the first electrode plate 210 serves as the cathode, the outermost electrode plate of the jelly-roll electrode assembly 200 may be the first electrode plate 210 serving as the cathode. When the first electrode plate 210 serves as the anode, the outermost electrode plate of the jelly-roll electrode assembly 200 may be the second electrode plate 220 serving as the cathode.

An embodiment will be explained below assuming that the first electrode plate 210 is a cathode and the second electrode plate 220 is an anode. A separator 230 may be a porous film including, e.g., polyethylene (PE), polypropylene (PP) or composite film thereof. The separator 230 may interrupt electron conduction between the first and second electrode plates 210 and 220 in the electrode assembly 200, and may allow lithium ions to move smoothly. The separator 230 may prevent contact between the first and second electrode plates 210 and 220, and may also prevent temperature increase through, e.g., shut-down, etc., when the temperature of the secondary battery 1000 is unexpectedly increased.

In the electrode assembly 200, lithium ions may move from the first electrode plate 210 to the second electrode plate 220 during charging, and may be intercalated thereto. During discharging, lithium ions may be deintercalated from the second electrode plate 220 to the first electrode plate 210, thereby allowing voltage to be applied to an external device.

The cap assembly 300 may include a cap plate 310, an electrode terminal 320, a gasket 330, an insulation plate 340 and a terminal plate 350. The cap assembly 300 may be combined with the electrode assembly 200 at the upper opening 101 of the can 100 along with an insulation case 360, thereby sealing the can 100.

The cap assembly 300 will be explained in detail below with reference to FIGS. 2 to 4. Referring to FIGS. 2 to 4, the cap assembly 300 may include the cap plate 310, electrode terminal 320, gasket 330, insulation plate 340 and terminal plate 350.

The cap plate 310 may have a rectangular plate shape. A terminal groove 313 and a terminal hole 315 (FIG. 1) may be formed in the middle of the cap plate 310. An electrolyte injection hole (not shown) and a safety vent (not shown) may be formed at one side of the cap plate 310. The cap plate 310 may be formed of a metal plate having a size corresponding to the opening 101 of the can 100. The terminal groove 313 may have the same shape as the plate portion 323 to be described later. The plate portion 323 may have a rectangular shape. A long edge of the rectangular terminal groove 313 may be defined as a first side 313a and a short edge thereof may be defined as a second side 313b. The terminal hole 315 may be disposed in the middle of the terminal groove 313. The terminal hole 315 may be cylindrical and extend toward the lower part of the can 100. The cap plate 310 may be electrically coupled to the first electrode tab 217.

The electrode terminal 320 may be disposed on the gasket 330. The electrode terminal 320 may include a terminal post 321 inserted into a center hole 335 of the gasket 330, and a plate portion 323 on the gasket 330. The terminal post 321 may have a cylindrical shape so as to be inserted into the terminal hole 315 and gasket post 331. A long edge of the plate portion 323 may be defined as a first side 323a and a short edge thereof may be defined as a second side 323b. The terminal post 321 may be electrically coupled to the second electrode tab 227.

The gasket 330 may include a gasket post 331 and a gasket plate 333. The gasket post 331 may be inserted into the terminal groove 313. The gasket post 331 may include a center hole in the middle thereof and may have a cylindrical shape so as to be inserted into the terminal hole 315. The gasket plate 333 may be seated in the terminal groove 313. The gasket 330 may include a center hole 335 extending from the middle of the gasket plate 333 to the end of the gasket post 331. The gasket plate 333 may have a rectangular shape so as to be seated in the terminal groove 313. In other words, the terminal groove 313, gasket plate 333 and plate portion 323 may each have a rectangular shape. A long edge of the gasket plate 333 may be defined as a first side 333a and a short edge thereof may be defined as a second side 334b. The gasket 330 may include insulating material, e.g., rubber. Accordingly, the gasket 330 may insulate the electrode terminal 320 (anode) from the cap plate 310 (cathode).

The insulation plate 340 may be coupled to a lower surface of the cap plate 310, and may include the same insulating material used to form the gasket 330. The terminal plate 350 may be coupled to a lower surface of the insulation plate 340 and may include, e.g., nickel alloy. The insulation plate 340 and terminal plate 350 may each have a rectangular plate shape. After the terminal post 321 is inserted into the insulation plate 340 and terminal plate 350, a portion of the terminal post 321 may project below the terminal plate 350. The projected portion of the terminal post 321 may be pressed around a hole of the terminal plate 350 through, e.g., a spinning process.

A cell may be formed by combining the cap assembly 300 with the upper opening 101 of the can 100 containing the electrode assembly 200. The edge (X) of the cap plate 310 and the edge 102 of the upper opening 101 may be strongly sealed by, e.g., welding.

A conventional gasket may surround an outer part of the electrode terminal. However, a portion of the gasket may be burned during welding because the can may be welded to the cap plate at a position very close to the gasket. The gasket may be very sensitive to heat generated during welding because of the materials used to form it.

Recently, with the tendency of developing lightweight and slim portable electronic devices, more compact secondary batteries have been developed as a power supply for electronic devices. Accordingly, the cap plate has also become smaller. Therefore, the distance between the welded edge of the cap plate and the gasket has become shorter; and thus a portion of the gasket may be burned by heat generated during welding, even if the welding is precisely performed. In addition, due to the smaller size of the cap plate, it may be very difficult to align the welding position precisely when, e.g., resistance welding or laser welding, is performed. Accordingly, the gasket may be burned by a welding position error of only about a few hundred micrometers.

The plate portion 323 of the electrode terminal 320 and the gasket plate 333 of the gasket 330 may be spaced apart from the terminal groove 313. More particularly, the first side 323a of the plate portion 323 and the first side 333a of the gasket plate 333 may be spaced apart from the first side 313a of the terminal groove 313. Preferably, a distance L1 between the first side 313a of the terminal groove 313 and the first side 333a of the gasket plate 333 is about the same as a distance L2 between the first side 313a of the terminal groove 313 and the first side 323a of the terminal plate 323.

By the above structure, the gasket 330 may be spaced apart by a predetermined distance from the welding position between the can 100 and cap plate 310. Accordingly, it is possible to prevent the gasket 330 from being burned by welding. In addition, the gasket 330 may be located inside the terminal groove of the cap plate 310, and not directly exposed to heat generated during welding. Thus, it is possible to prevent the gasket 330 from being melted or burned. In addition, even if the gasket 330 is burned due to, e.g., aligning error or high heat during welding, the appearance of the secondary battery 1000 may not be affected because the gasket 330 is located inside the cap plate 310.

In addition, the second side 323b of the plate portion 323 and a second side 334b of the gasket plate 333 may be spaced apart from the second side 313b of the terminal groove 313. Preferably, a distance L3 between the second side 313b of the terminal groove 313 and the second side 334b of the gasket plate 333 is about the same as a distance L4 between the second side 313b of the terminal groove 313 and the second side 323b of the terminal plate 323.

By the above structure, the plate portion 323 (anode) and the cap plate 310 (cathode) may contact each other to cause a controlled short when the secondary battery 1000 is compressed. Accordingly, undesirable heat generation and explosion due to a short of the electrode assembly 200 inside the can may be reduced by causing the controlled short between the terminal plate 323 and cap plate 310.

Figure 5:
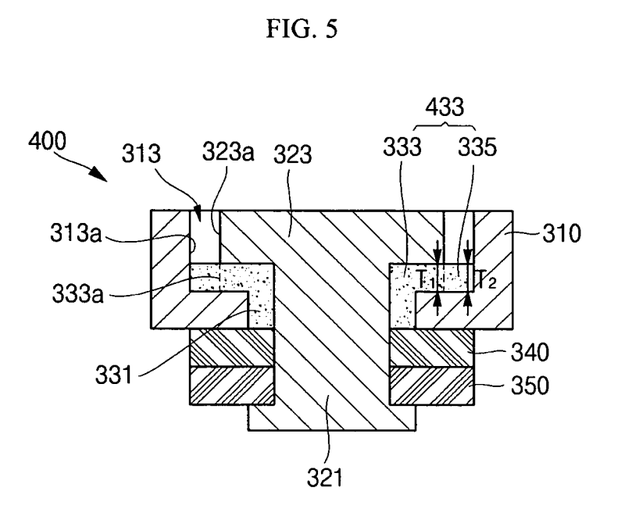
FIG. 5 illustrates a vertical sectional view of a cap assembly according to another embodiment along the line B-B' of FIG. 2.
Figure 6:
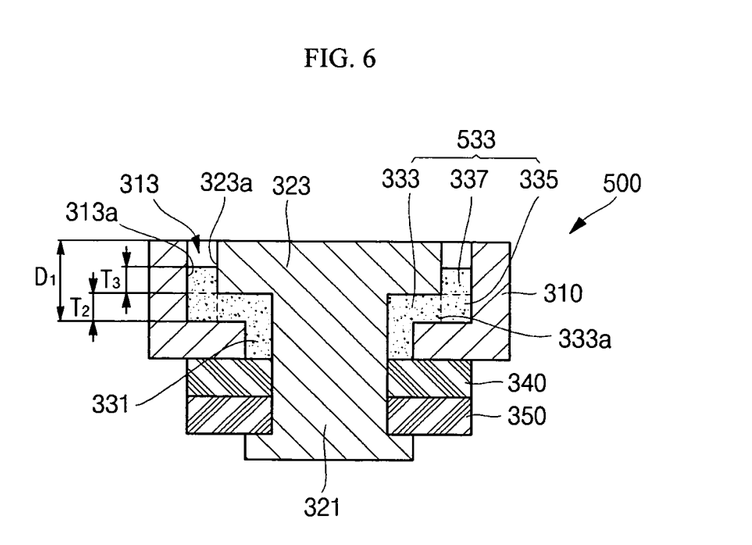
FIG. 6 illustrates a vertical sectional view of a cap assembly according to yet another embodiment along the line B-B' of FIG. 2.

FIGS. 5 and 6 illustrate vertical sectional views along the line B-B' of FIG. 2 of cap assemblies 400 and 500 according to further embodiments.

Referring to FIG. 5, in the cap assembly 400, a gasket plate 433 may further include an extended part 335 extending toward a first side 313a of a terminal groove 313 from a first side 333a of the gasket plate 333 shown in FIG. 4. The extended part 335 may have, e.g., a hexahedral shape, more particularly, a rectangular parallelepiped shape. The extended part 335 may contact, or be spaced apart from, the first side 313a of the terminal groove 313.

The extended part 335 may fill a space between the electrode terminal 320 and the cap plate 310, thereby preventing movement of the electrode terminal 320. In addition, the extended part 335 may improve insulation between the cap plate 310 and electrode terminal 320.

The gasket plate 433 including the extended part 335 may be more easily burned during welding compared to the gasket plate 333 of FIG. 4. However, the burnt areas may be reduced in comparison with the gasket located on the cap plate 310 with no terminal groove 313, because the extended part 335 may be in the terminal groove 313 between the cap plate 310 and electrode terminal 320. In addition, even if a portion of the extended part 335 is burned, the burnt portion may not be exposed to the outside. Thus, appearance of the secondary battery 1000 may remain unaffected.

A thickness T1 of the gasket plate 333 may be the same as a thickness T2 of the extended part 335. Accordingly, the manufacturing process may be simplified by forming the gasket plate 333 and extended part 335 integrally with each other.

Referring to FIG. 6, in the cap assembly 500, a gasket plate 533 may further include a projected part 337 on the extended part 335. The projected part 337 may have a hexahedral shape, more particularly, a rectangular parallelepiped shape.

The projected part 337 may also fill the space between the electrode terminal 320 and cap plate 310, thereby preventing movement of the electrode terminal 320. In addition, the projected part 337 may improve insulation between the cap plate 310 and electrode terminal 320.

The gasket plate 533 including the projected part 337 may be more easily burned during welding compared to the gasket plate 333 of FIG. 4. However, the burnt area may be reduced in comparison with a gasket located on the cap plate 310 with no terminal groove 313, because the projected part 337 may be inside the terminal groove 313 between the cap plate 310 and electrode terminal 320. In addition, even if a portion of the projected part 337 is burned by welding, the burnt portion may not be exposed to the outside. Thus, appearance of the secondary battery 1000 may remain unaffected.

The sum of the thicknesses T2 and T3 of the extended part 335 and projected part 337 may be the same as, or smaller than, a depth D1 of the terminal groove 313. When the sum of the thicknesses (T2+T3) is larger than the depth D1 of the terminal groove 313, the gasket plate 533 may project out from the cap plate 310. Accordingly, the gasket plate 533 may be more easily burned and the burnt portion may be exposed to the outside, thereby degrading the appearance.

Figure 7:
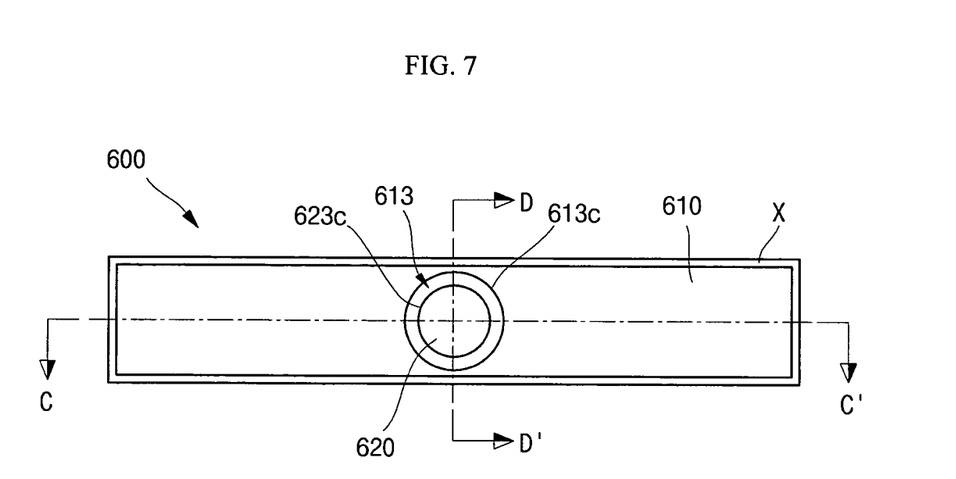
FIG. 7 illustrates a plan view of a cap assembly according to the second embodiment.
Figure 8:
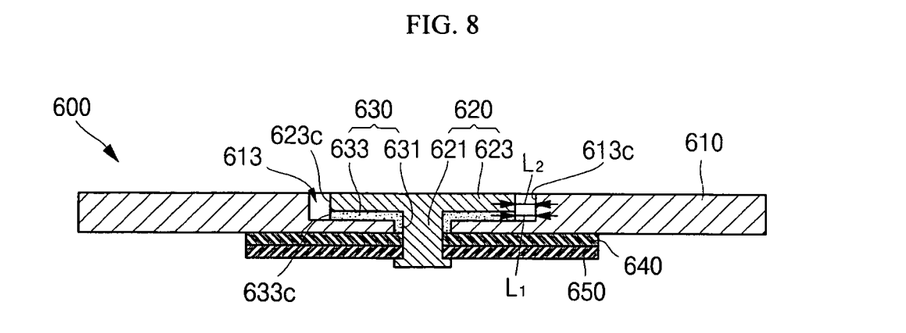
FIG. 8 illustrates a vertical sectional view of the cap assembly according to the second embodiment along the line C-C' of FIG. 7.
Figure 9:
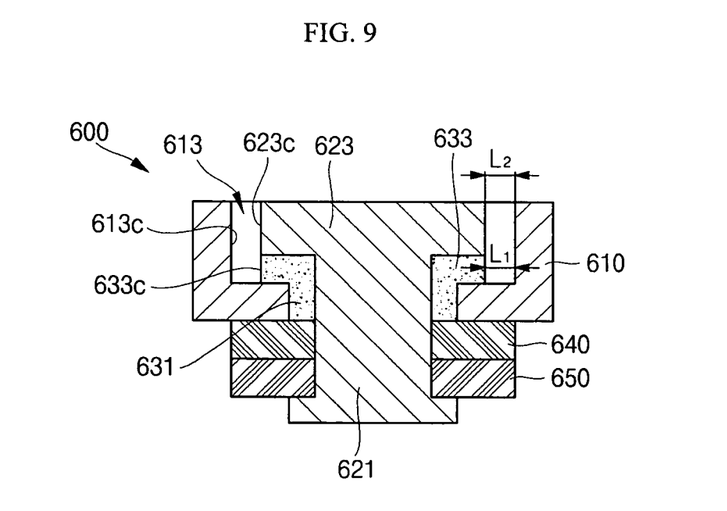
FIG. 9 illustrates a vertical sectional view of the cap assembly according to the second embodiment along the line D-D' of FIG. 7.

FIG. 7 illustrates a plan view of a cap assembly 600 according to another embodiment. FIGS. 8 and 9 illustrate vertical sectional views of the cap assembly 600 along the lines C-C' and D-D' of FIG. 7.

Referring to FIGS. 7 to 9, the cap assembly 600 may include a cap plate 610, an electrode terminal 620, a gasket, an insulation plate 640 and a terminal plate 650. A plate portion 623 of the electrode terminal 620 may have a, e.g., rounded or circular shape.

The cap plate 610 may have a rectangular plate shape. A terminal groove 613 and a terminal hole may be formed in the middle of the cap plate 610. The terminal groove 613 may be formed in a, e.g., rounded or circular shape, similar to the plate portion 623. In the cap plate 610, a stepped portion forming the side of the terminal groove 613 may be defined as the inner circumference 613c of the terminal groove 613. The terminal hole may be in the middle of the terminal groove

613. The terminal hole may be cylindrical and extend towards the lower part of the can 100. The cap plate 610 may be electrically coupled to the first electrode tab 217.

The electrode terminal 620 may be disposed on a gasket 630 to be described later. The electrode terminal 620 may include a terminal post 621 inserted into a center hole of the gasket 630, and the plate portion 623 located on the gasket 630. The terminal post 621 may have a cylindrical shape so as to be inserted into the terminal hole and center hole. A circumferential side of the plate portion 623 may be defined as an outer circumference 623c. The terminal post 621 may be electrically coupled to the second electrode tab 227.

The gasket 630 may include a gasket post 631 and a gasket plate 633. The gasket post 631 may be inserted into the terminal groove 613. The gasket post 631 may include a center hole in the middle thereof, and may have a cylindrical shape so as to be inserted into the terminal hole. The gasket plate 633 may be seated in the terminal groove 613. The gasket 630 may include a center hole that extends from the middle of the gasket plate 633 to the end of the gasket post 631. The gasket plate 633 may have a, e.g., rounded or circular shape, so as to be seated in the terminal groove 613. In other words, the terminal groove 613, gasket plate 633 and plate portion 623 may each have a, e.g., rounded or circular shape. A circumferential side of the gasket plate 633 may be defined as the outer circumference 633c. The gasket 630 may include an insulating material, e.g., rubber. Accordingly, the gasket 630 may insulate the electrode terminal 620 (anode) from the cap plate 610 (cathode).

The insulation plate 640 may be coupled to a lower surface of the cap plate 610, and may include the same insulating material used to form the gasket 630. The terminal plate 650 may be coupled a lower surface of the insulation plate 640, and may include, e.g., nickel alloy. The insulation plate 640 and terminal plate 650 may each have a rectangular plate shape. After the terminal post 621 is inserted into the insulation plate 640 and terminal plate 650, a portion of the terminal post 621 may project downward. The projected portion of the terminal post 621 may be pressed around a hole of the terminal plate 650 through, e.g., a spinning process.

The plate portion 623 of the electrode terminal 620 and the gasket plate 633 of the gasket may be spaced apart from the terminal groove 613. More particularly, the outer circumference 623c of the terminal plate 623 and the outer circumference 633c of the gasket plate 633 may be spaced apart from the inner circumference 613c of the terminal groove 613. Preferably, a distance L1 between the inner circumference 613c of the terminal groove 613 and the outer circumference 633c of the gasket plate 633 is about the same as a distance L2 between the inner circumference 613c of the terminal groove 613 and the outer circumference 623c of the terminal plate 623.

By the above structure, the gasket 630 may be spaced by a predetermined distance from the welding position between the can and cap plate 610. Accordingly, it is possible to prevent the gasket 630 from being burned during welding. In addition, the gasket 630 may be disposed inside the terminal groove 613 of the cap plate 610 and not directly exposed to heat generated during welding. Thus, it is possible to prevent the gasket 630 from being melted or burned. In addition, even if the gasket is burned due to, e.g., aligning error or high heat during welding, the appearance of the secondary battery 1000 may remain unaffected because the gasket 630 may be disposed inside the cap plate 610.

In addition, the plate portion 623 (anode) and the cap plate 610 (cathode) may contact each other to cause a controlled short when the secondary battery is compressed. Accordingly, undesirable heat generation and risk of explosion due to a short of the electrode assembly 200 within the can may be reduced by causing a controlled short between the terminal plate 623 and cap plate 610.

Figure 10:
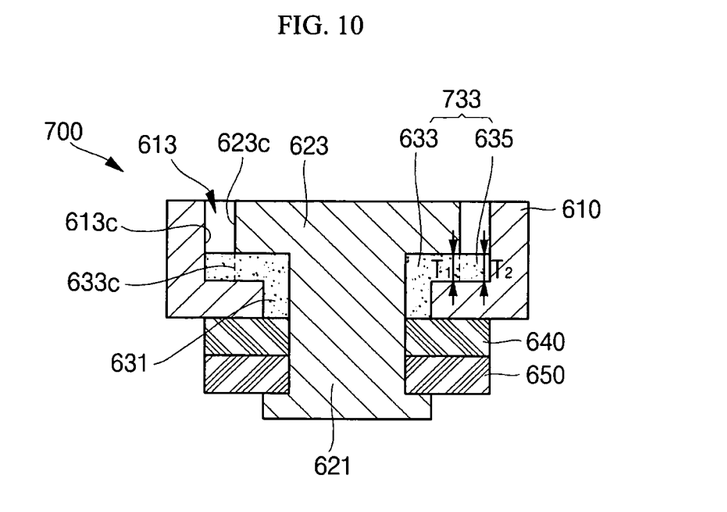
FIGS. 10 and 11 illustrate vertical sectional views of a cap assembly according to further embodiments along the line D-D' of FIG. 7.
Figure 11:
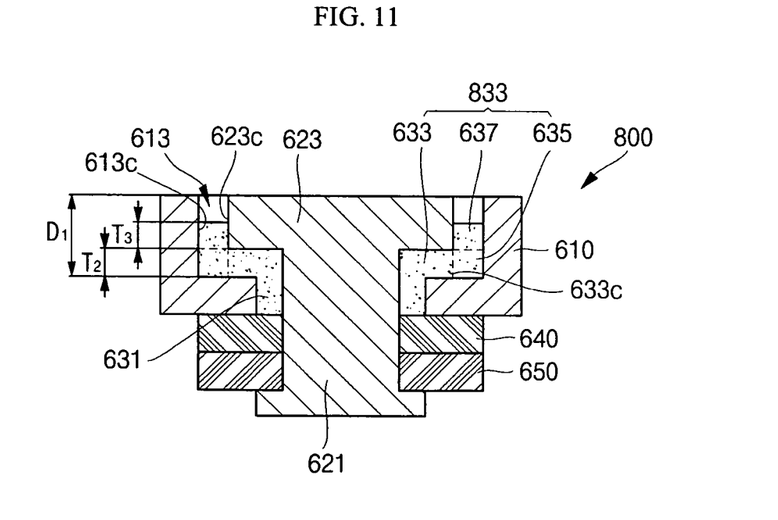

FIGS. 10 and 11 illustrate vertical sectional views of cap assemblies 700 and 800 according to further embodiments along the line D-D' of FIG. 7. Referring to FIG. 10, a gasket plate 733 may further include an extended part 635 extending toward the inner circumference 613c of the terminal groove 613 from the outer circumference 633c of the gasket plate 633 shown in FIG. 9. The extended part 635 may have a ring shape with a flat outer surface. The extended part 635 may contact, or be spaced apart from, the inner circumference 613c of the terminal groove 613.

The extended part 635 may fill the space between the electrode terminal 620 and the cap plate 610, thereby preventing movement of the electrode terminal 620. In addition, the extended part 635 may improve insulation between the cap plate 610 and electrode terminal 620.

The gasket plate 733 including the extended part 635 may be more easily burned during welding as compared to the gasket plate 633 of FIG. 9. However, the burnt area may be reduced in comparison with a gasket disposed on the cap plate 610 with no terminal groove, because the extended part 635 may be inside the terminal groove 613 between the cap plate 610 and electrode terminal 620. In addition, even if a portion of the extended part 635 is burned by welding, the burnt portion may not be exposed to the outside. Thus, appearance of the secondary battery 1000 may remain unaffected.

A thickness T1 of the gasket plate 633 may be the same as a thickness T2 of the extended part 635. Accordingly, the manufacturing process may be simplified by forming the gasket plate 633 and extended part 635 integrally with each other.

Referring to FIG. 11, in the cap assembly 800, a gasket plate 833 may further include a projected part 637 on the extended part 635. The projected part 637 may have ring shape with a flat outer surface.

The projected part 637 may also fill the space between the electrode terminal 620 and cap plate 610, thereby preventing movement of the electrode terminal 620. In addition, the projected part 637 may improve insulation between the cap plate 610 and electrode terminal 620.

The gasket plate 833 including the projected part 637 may be more easily burned during welding as compared to the gasket plate 633 of FIG. 9. However, the burnt area may be reduced in comparison with the gasket disposed on a cap plate 610 with no terminal groove, because the projected part 637 may be inside the terminal groove 613 between the cap plate 610 and electrode terminal 620. In addition, even if a portion of the projected part 637 is burned by welding, the burnt portion may not be exposed to the outside. Thus, appearance of the secondary battery may remain unaffected.

The sum of the thicknesses T2 and T3 of the extended part 635 and projected part 637 may be the same as, or smaller than, a depth D1 of the terminal groove 613. When the summed thickness (T2+T3) is larger than the depth D1 of the terminal groove 613, the gasket plate 833 may project out from the cap plate 610. Accordingly, the gasket plate 833 may be more easily burned and the burnt portion may be exposed to the outside, thereby degrading the appearance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A secondary battery, comprising:
an electrode assembly;
a can housing the electrode assembly; and
a cap assembly on the can, wherein:
the cap assembly includes:
   a cap plate having a terminal hole and a terminal groove having at least one side that extends from the bottom of the terminal groove;
   a gasket on the cap plate having a center hole; and
   an electrode terminal having a terminal post in the center hole and a plate portion disposed on the gasket and having at least one side;
the gasket including:
   a gasket post in the terminal hole, and
   a gasket plate seated in the terminal groove, the gasket plate having a flat upper part and at least one side; and
at least one side of the plate portion of the electrode terminal and at least one side of the gasket plate being spaced apart from the at least one side of the terminal groove;
wherein:
   the plate portion, the gasket plate and the terminal groove each have a first side, and the first side of the plate portion and the first side of the gasket plate are spaced apart from the first side of the terminal groove; and
   a distance between the first side of the plate portion and the first side of the terminal groove is about the same as a distance between the first side of the gasket plate and the first side of the terminal groove.

2. The secondary battery as claimed in claim 1, wherein the plate portion, the gasket plate and the terminal groove each have a second side different from the first side, and the second side of the plate portion and the second side of the gasket plate are spaced apart from the second side of the terminal groove.

3. The secondary battery as claimed in claim 2, wherein a distance between the second side of the plate portion and the second side of the terminal groove is about the same as a distance between the second side of the gasket plate and the second side of the terminal groove.

4. The secondary battery as claimed in claim 1, wherein the plate portion and the gasket plate each have a rounded shape and an outer circumference defining the at least one side; wherein the terminal groove has a rounded shape and an inner circumference defining the at least one side; and wherein the outer circumference of the plate portion and the outer circumference of the gasket plate are spaced apart from the inner circumference of the terminal groove.

5. The secondary battery as claimed in claim 3, wherein a distance between the outer circumference of the plate portion and the inner circumference of the terminal groove is about the same as a distance between the outer circumference of the gasket plate and the inner circumference of the terminal groove.

6. The secondary battery as claimed in claim 1, further comprising an insulation plate under the cap plate.

7. The secondary battery as claimed in claim 6, wherein the gasket and the insulation plate include the same insulating material.

* * * * *